United States Patent
Gong et al.

(10) Patent No.: US 10,158,297 B1
(45) Date of Patent: Dec. 18, 2018

(54) SYNCHRONOUS RECTIFICATION CONTROL FOR FLYBACK CONVERTER

(71) Applicant: Infineon Technologies Austria AG, Villach (AT)

(72) Inventors: Xiaowu Gong, Singapore (SG); Marc Fahlenkamp, Geretsried (DE); Anthony Sanders, Weissenfeld (DE)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/627,579

(22) Filed: Jun. 20, 2017

(51) Int. Cl.
  *H02M 3/335* (2006.01)

(52) U.S. Cl.
  CPC .............................. *H02M 3/33592* (2013.01)

(58) Field of Classification Search
  CPC ..................... H02M 3/33576; H02M 3/33592
  USPC ........................................... 323/21.14, 95–97
  See application file for complete search history.

(56) References Cited

U.S. PATENT DOCUMENTS

| | | | |
|---|---|---|---|
| 2014/0003096 A1* | 1/2014 | Deng ................ | H02M 3/33592 363/21.14 |
| 2014/0192565 A1* | 7/2014 | Wang ................ | H02M 3/33592 363/21.14 |

OTHER PUBLICATIONS

"AN-6204—FAN6204—Synchronous Rectification Controller for Flyback and Forward Freewheeling Rectification", Fairchild Semiconductor, Rev. 1.0.2, Jan. 24, 2013.
"FAN6204—mWSaver™ Synchronous Rectification Controller for Flyback and Forward Freewheeling Rectification", Fairchild Semiconductor, Rev 1.4, Feb. 2016.

\* cited by examiner

*Primary Examiner* — Nguyen Tran
(74) *Attorney, Agent, or Firm* — Murphy, Bilak & Homiller, PLLC (57) ABSTRACT

A flyback converter includes a primary-side switch connected to a primary-side winding of a transformer and a secondary-side switch connected to a secondary-side winding of the transformer. The flyback converter is operated by controlling the primary-side switch to store energy in the transformer during ON periods of the primary-side switch, switching on the secondary-side switch synchronously with switching off the primary-side switch to transfer energy from the transformer to the secondary side, determining an off time of the secondary-side switch based on a reflected input voltage measured at the secondary-side winding when the primary-side switch is on, accounting for a settling time of the reflected input voltage when determining the off time of the secondary-side switch so that the settling time has little or no effect on the off time, and switching off the secondary-side switch based on the off time.

12 Claims, 8 Drawing Sheets

SYNCHRONOUS RECTIFICATION CONTROL FOR FLYBACK CONVERTER

TECHNICAL FIELD

The present application relates to flyback converters, in particular synchronous rectification control for flyback converters.

BACKGROUND

A flyback converter is a transformer-isolated converter based on the basic buck-boost topology. In a flyback converter, a switch is connected in series with the transformer primary side. The transformer is used to store energy during ON periods of the primary switch, and provides isolation between the input voltage source and the output voltage. In a steady state of operation, when the primary switch is ON for a period of TON, during the TON period, a diode on the secondary side becomes reverse-biased and the transformer behaves as an inductor. The value of this inductor is equal to the transformer primary magnetizing inductance $L_M$, and the stored magnetizing energy from the input voltage source. As such, the current in the primary transformer (magnetizing current $I_M$) rises linearly from an initial value to a peak value. As the diode on the secondary side becomes reverse-biased, the load current is supplied from an output capacitor on the secondary side. The output capacitor value is ideally large enough to supply the load current for the time period TON, with the maximum specified drop in output voltage.

To increase system efficiency, flyback converters typically use Synchronous Rectification (SR) controller and a secondary-side SR power MOSFET. The secondary-side SR power MOSFET is turned on and off synchronously with the primary side power MOSFET. Some conventional secondary-side controllers have an SR sense pin used for voltage sensing to turn off the SR power MOSFET on the secondary side, and which has a very high breakdown voltage requirement (e.g. up to 120V or even higher), so the chip technology used to implement the secondary-side controller must support very high voltages. The SR sense pin is used for voltage sensing, which has a very low negative threshold voltage comparison requirement (e.g. around −10 mV with 10 uV accuracy), which is very difficult to implement in standard chip technologies. Other conventional secondary-side controllers do not require high voltage technology for the controller and do not need to compare against a very low negative threshold voltage for detecting when to turn off the secondary-side SR power MOSFET. However, these controllers suffer from settling time variation which causes the measurement of the reflected input voltage from the secondary side of the transformer to have some error, especially for high frequency and high input line cases. This variation greatly influences the calculation of the turn-on timing for the secondary-side SR power MOSFET. Errors in the SR on-time calculations is problematic, and leads to inefficient operation. Accordingly, conventional secondary-side controllers are designed for applications operating over a relatively narrow operating range. Improved secondary-side controllers and SR control techniques are therefore desired.

SUMMARY

According to an embodiment of a method of operating a flyback converter having a primary-side switch connected to a primary-side winding of a transformer and a secondary-side switch connected to a secondary-side winding of the transformer, the method comprises: controlling the primary-side switch to store energy in the transformer during ON periods of the primary-side switch; switching on the secondary-side switch synchronously with switching off the primary-side switch to transfer energy from the transformer to the secondary side; determining an off time of the secondary-side switch based on a reflected input voltage measured at the secondary-side winding when the primary-side switch is on; accounting for a settling time of the reflected input voltage when determining the off time of the secondary-side switch, so that the settling time has little or no effect on the off time; and switching off the secondary-side switch based on the off time.

According to an embodiment of a flyback converter, the flyback converter comprises a primary-side switch connected to a primary-side winding of a transformer, a secondary-side switch connected to a secondary-side winding of the transformer, a primary-side controller operable to control the primary-side switch to store energy in the transformer during ON periods of the primary-side switch and a secondary-side controller. The secondary-side controller is operable to: switch on the secondary-side switch synchronously with switching off the primary-side switch to transfer energy from the transformer to the secondary side; determine an off time of the secondary-side switch based on a reflected input voltage measured at the secondary-side winding when the primary-side switch is on; account for a settling time of the reflected input voltage when determining the off time of the secondary-side switch, so that the settling time has little or no effect on the off time; and switch off the secondary-side switch based on the off time.

According to an embodiment of a secondary-side controller for a flyback converter having a primary-side switch connected to a primary-side winding of a transformer and a secondary-side switch connected to a secondary-side winding of the transformer, the secondary-side controller comprises circuitry operable to switch on the secondary-side switch synchronously with switching off the primary-side switch to transfer energy from the transformer to the secondary side, determine an off time of the secondary-side switch based on a reflected input voltage measured at the secondary-side winding when the primary-side switch is on, account for a settling time of the reflected input voltage when determining the off time of the secondary-side switch, so that the settling time has little or no effect on the off time, and switch off the secondary-side switch based on the off time.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein compensate for the settling time portion of the primary-side switch of a flyback converter, and use this compensation to adjust the on-time period of the secondary-side SR switch. In some embodiments, previous or present sampled input voltage information is used to modify the on-time period of the secondary-side SR switch. In other embodiments, correct input voltage information is obtained from the previous switching cycle (settled voltage) and the turn-off time of the SR switch on the secondary side is optimized for the next cycle based on this information. In general, the primary-side switch is controlled to store energy in the flyback transformer during ON periods of the primary-side switch. The secondary-side switch is switched synchronously with switching off the primary-side switch to transfer energy from the transformer to the secondary side of the flyback converter. The off time of the secondary-side switch, which occurs at the end of the on-time period for the secondary-side switch, is determined based on the reflected input voltage measured at the secondary-side winding of the flyback transformer when the primary-side switch is on. The settling time of the reflected input voltage is accounted for when determining the off time of the secondary-side switch, so that the settling time has little or no effect on the off time. The secondary-side switch is switched off based on the (compensated) off time.

Figure 1:
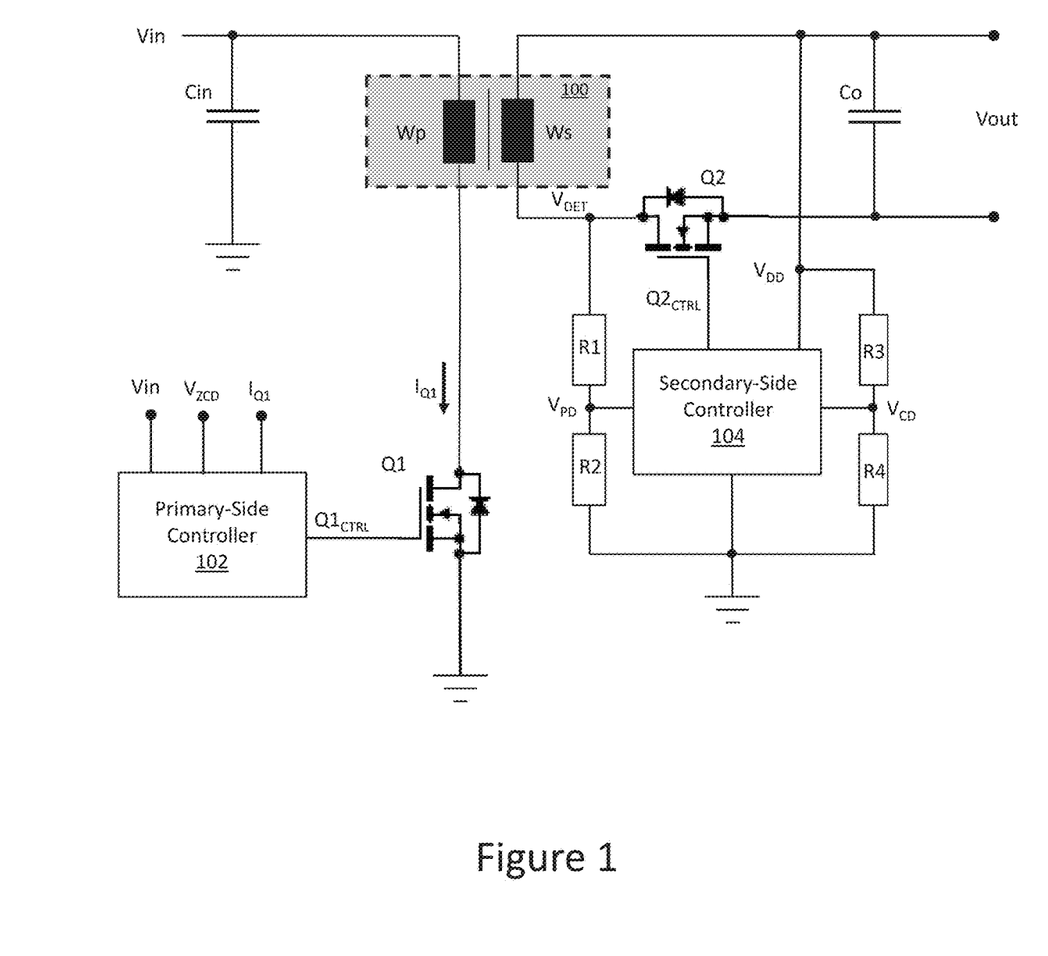
FIG. 1 illustrates a block diagram of an embodiment of a flyback converter with compensated secondary-side SR switch control.

FIG. 1 illustrates an embodiment of a flyback converter that includes a primary-side switch Q1 connected to a primary-side winding Wp of a transformer 100, a secondary-side switch Q2 connected to a secondary-side winding Ws of the transformer 100 and a primary-side controller 102 operable to control the primary-side switch Q1 to store energy in the transformer 100 during ON periods of the primary-side switch Q1. The primary-side and secondary-side switches Q1, Q2 are shown as power MOSFETs with integrated diodes in FIG. 1. However, any suitable power transistors can be used for the primary-side and secondary-side switches Q1, Q2 such as but not limited to power MOSFETs, IGBTs (insulated gate bipolar transistors), HEMTs (high-electron mobility transistors), etc. Switching of the primary-side switch Q1 is controlled by the primary-side controller 102 which generates a signal $Q1_{CTRL}$ based on the input voltage Vin, current $I_{Q1}$ through the primary-side switch Q1, and a zero-cross detect voltage developed by a resistor divider (not shown for ease of illustration) coupled to an auxiliary winding (also not shown for ease of illustration) on the primary side of the flyback converter. Switching control of a primary-side switch of a flyback converter is well known in the art, and therefore no further explanation is provided with respect to the switching control of primary-side switch Q1.

The flyback converter also includes a secondary-side controller 104 for controlling the secondary-side switch Q2 connected to the secondary-side winding Ws of the flyback transformer 100. The secondary-side controller 104 switches on the secondary-side switch Q2 synchronously with switching off the primary-side switch Q1, to transfer energy from the transformer 100 to the secondary side of the flyback converter. The secondary-side controller 104 also determines the off time of the secondary-side switch Q2, which occurs at the end of the on-time period for the secondary-side switch, based on the reflected input voltage $V_{DET}$ measured at the secondary-side winding Ws of the transformer 100 when the primary-side switch Q1 is on. The reflected input voltage $V_{DET}$ measured on the secondary side has the correct information about the bulk (input voltage) when the primary-side switch Q1 turns on, and is stepped down to voltage $V_{PD}$ by a resistor divider formed by resistors $R_1$ and $R_2$ for input to the secondary-side controller 104.

The secondary-side controller 104 also accounts for the settling time of the reflected input voltage $V_{DET}$ when determining the off time of the secondary-side switch Q2, so that the settling time has little or no effect on the off time, and switches off the secondary-side switch Q2 based on the (compensated) off time.

When primary-side switch Q1 is turned off, secondary side peak current based on discontinuous conduction mode (DCM) operation is given by:

$$I_{SP} = \frac{N_P}{N_S} \times I_{PP} \quad (1)$$

where $I_{SP}$ is the peak current of the secondary-side winding Ws, $I_{PP}$ is the peak current of the primary-side winding Wp, $N_P$ is the primary winding turns, and $N_S$ is the secondary winding turns. The peak current $I_{PP}$ of the primary-side winding Wp and the peak current $I_{SP}$ of the secondary-side winding Ws are given by:

$$I_{PP} = \frac{V_{in}}{L_P} \times T_{on} \quad (2)$$

and $$I_{SP} = \frac{V_{out}}{L_S} \times T_{DET} \quad (3)$$

where $L_P$ is the primary-side winding inductance, $V_{in}$ is the primary-side input voltage, $V_{out}$ is the system output voltage, $T_{on}$ is the turn-on period for the primary-side switch Q1, and $T_{DET}$ is the timing for secondary-side winding demagnetization, which should also be the turn-on period $T_{on}$ of the secondary-side switch Q2.

Inserting equations (2) and (3) into equation (1) yields:

$$\frac{V_{out}}{L_S} \times T_{DET} = \frac{N_P}{N_S} \times \frac{V_{in}}{L_P} \times T_{on}, \quad (4)$$

$$\frac{N_P}{N_S} = \sqrt{\frac{L_P}{L_S}} = n \text{ and} \quad (5)$$

$$\frac{V_{in} \times T_{on}}{n} = V_{out} \times T_{DET} \quad (6)$$

From equation (6), the inductor average voltage is zero during a switching period in steady state, so the product of charge-voltage and charge-time is equal to the product of discharge-voltage and discharge-time, which is referred to as the volt-second balance equation.

Equation (6) can be used to predict a solution for the on-time period and thus off time of the secondary-side switch Q2, but because of reflected input measurement error and parasitic parameters in the system, equation (6) may not be followed closely. The secondary-side controller 104 calculates the secondary-side winding demagnetization time $T_{DET}$ for the previous switching cycle and the present product of charge-voltage and charge-time, cancelling errors introduced by the measurement error and parasitic parameters.

For the $n^{th}$ switching cycle, the charge balance equation is given by:

$$\frac{[V_{in}(n) + \varepsilon] \times T_{on}(n)}{n} = V_{out}(n) \times T_{DET}(n) \quad (7)$$

where $\varepsilon$ is the measurement error for the reflected input voltage $V_{DET}$. For the $(n+1)^{th}$ switching cycle, the charge balance equation is given by:

$$\frac{[V_{in}(n+1) + \varepsilon] \times T_{on}(n+1)}{n} = V_{out}(n+1) \times T_{DET}(n+1) \quad (8)$$

Dividing equations (7) and (8) yields:

$$T_{DET}(n+1) = \frac{\frac{[V_{in}(n+1) + \varepsilon] \times T_{on}(n+1)}{n \times V_{out}(n+1)}}{\frac{[V_{in}(n) + \varepsilon] \times T_{on}(n)}{n \times V_{out}(n)}} \times T_{DET}(n) \quad (9)$$

Because the output capacitor $C_O$ of the flyback converter is relatively large, and for the two consecutive switching cycles (n) and (n+1), the output voltage will be the same and therefore $V_{out}(n) = V_{out}(n+1)$. Equation (9) can be simplified as given by:

$$T_{DET}(n+1) = \frac{\frac{[V_{in}(n+1) + \varepsilon] \times T_{on}(n+1)}{n}}{\frac{[V_{in}(n) + \varepsilon] \times T_{on}(n)}{n}} \times T_{DET}(n) \quad (10)$$

Based on the previous switching cycle demagnetization time and the calculated turn-on period for the secondary-side switch Q2, the secondary-side controller 104 updates the calculation and corrects the volt-second equation to yield an accurate turn-on period and thus off time for the secondary-side switch Q2 for the next switching cycle. The secondary-side controller 104 can tune the turn-on period and thus off time for the secondary-side switch Q2 based on the difference between the calculated turn-on time and the measured turn-on time, to yield more accurate results for turning on and turning off the secondary-side switch Q2.

Figure 2:
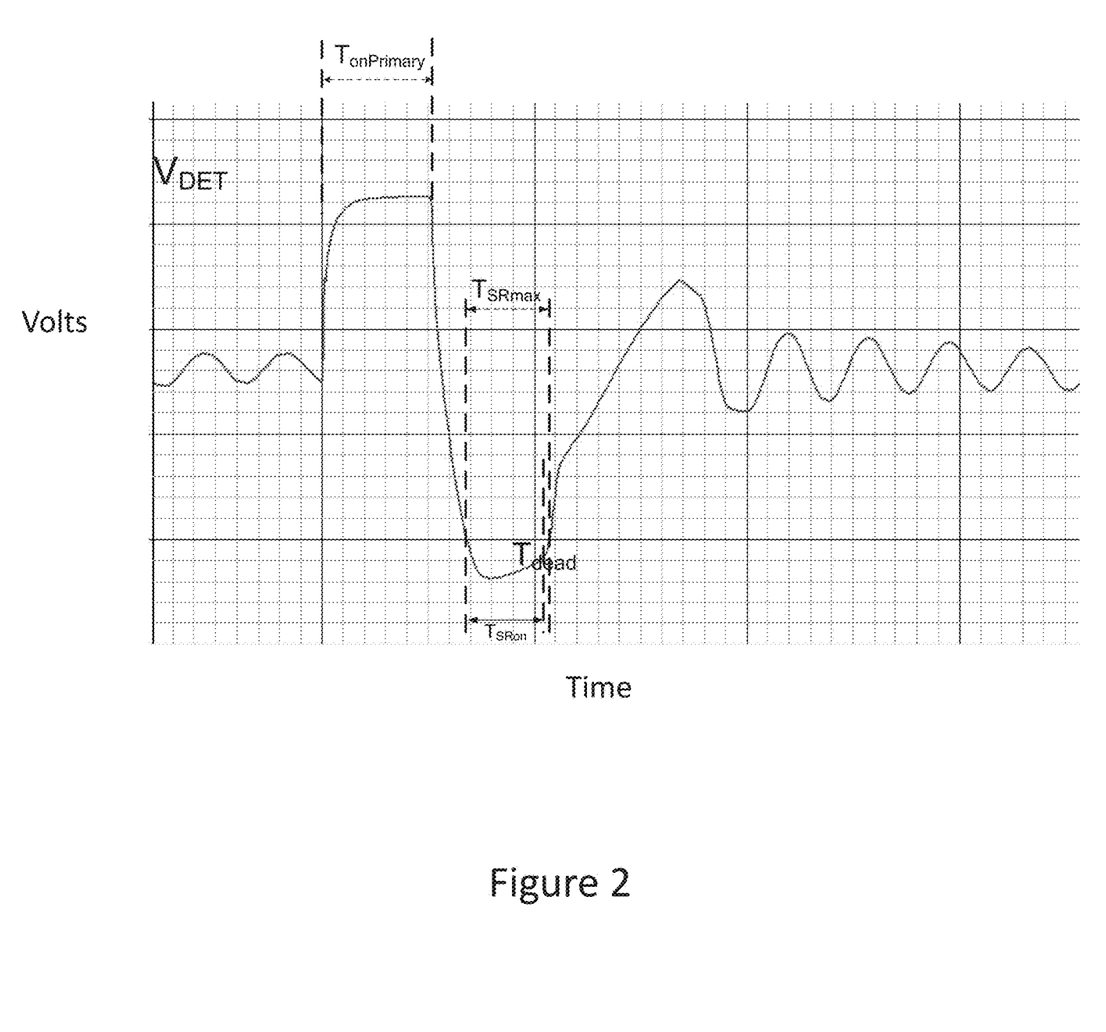
FIG. 2 illustrates a waveform diagram of the compensated secondary-side SR switch control technique.

FIG. 2 illustrates a waveform that shows how the secondary-side controller 104 tunes the calculated turn-on period and turn off time for the secondary-side switch Q2 as a function of the reflected input voltage $V_{DET}$ measured at the secondary-side winding Ws of the flyback transformer, where $T_{onPrimary}$ is the on-time period of the primary-side switch Q1, $T_{SRmax}$ is the maximum allowed turn-on period for the secondary-side switch Q2, $T_{SRon}$ is the compensated (adjusted) on-time period for switch Q2, and $T_{dead}$ is the time for switch Q2 to be turned off before approaching $T_{SRmax}$.

Figure 3:
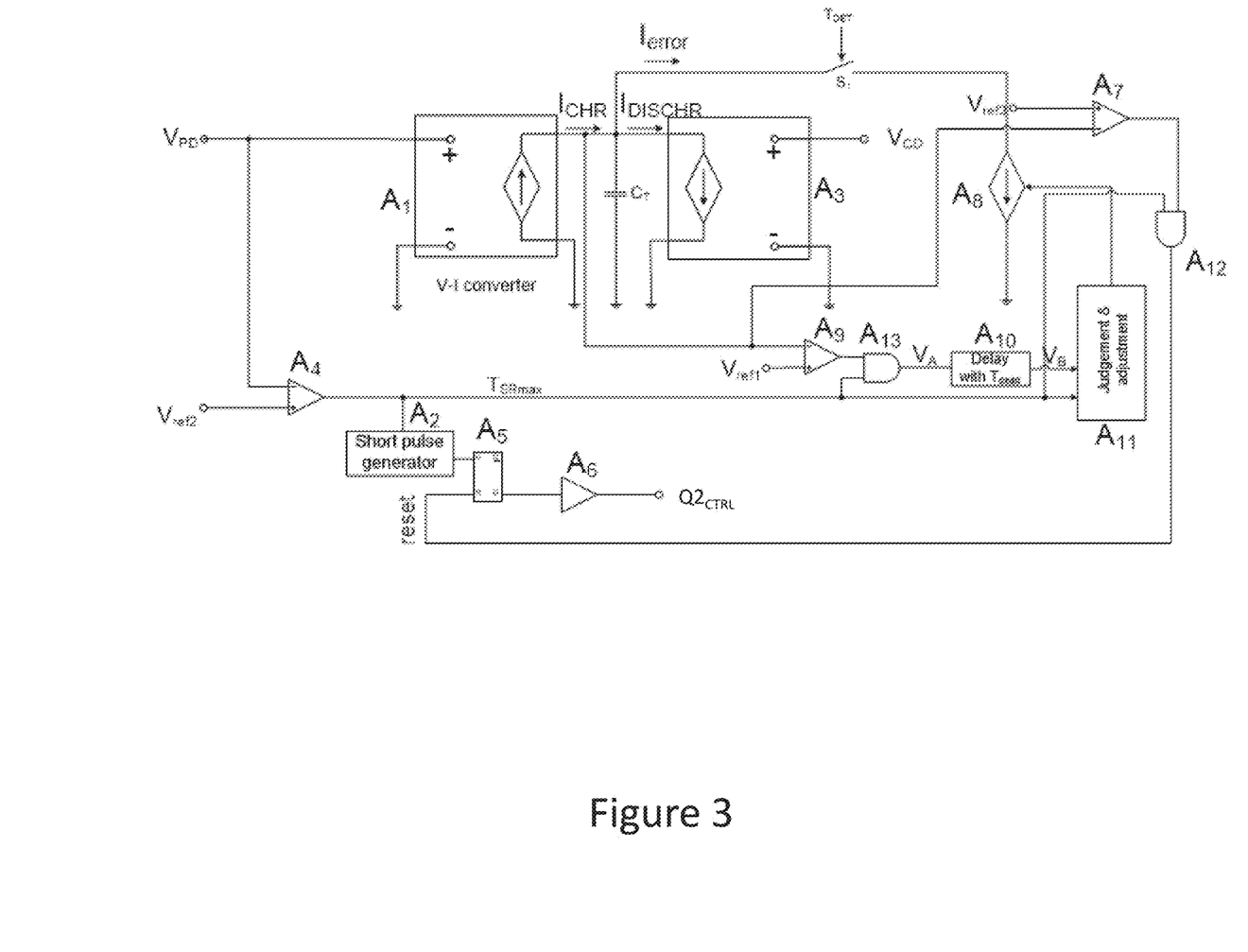
FIG. 3 illustrate a circuit diagram of an analog-based embodiment of the compensated secondary-side SR switch control technique.

FIG. 3 illustrates a block diagram of an analog-based implementation of the control technique implemented by the secondary-side controller 104. V-I (voltage-current) converter $A_3$ converts voltage $V_{CD}$ into current $I_{DISCHR}$, where $V_{CD}$ is the resistor divided output voltage provided by resistors $R_3$ and $R_4$ for input to the secondary-side controller 104. When the primary-side switch Q1 turns off, voltage $V_{PD}$ goes negative. V-I converter $A_3$ discharges internal capacitor $C_T$, which means the secondary-side switch Q2 is turned on. V-I converter $A_1$ converts voltage $V_{PD}$ into current $I_{CHR}$, where $V_{PD}$ is the resistor divided reflected input voltage provided by resistors $R_1$ and $R_2$ and measured by the secondary-side controller 104. V-I converter $A_1$ is on when the primary-side switch Q1 is on and voltage $V_{PD}$ is at a high voltage.

The secondary-side controller 104 uses the difference current $I_{CHR}-I_{DISCHR}$ to charge internal capacitor $C_T$ from a default voltage level $V_{ref1}$ during the turn-on period of the primary-side switch Q1. Current $I_{CHR}$ is given by:

$$I_{CHR} = \frac{\frac{R_2}{R_1+R_2} \times \left(\frac{V_{in}}{n} + V_{out}\right)}{R_{int1}} \quad (12)$$

where $R_{int1}$ an internal resistor for converting voltage $V_{PD}$ into current. Current $I_{DISCHR}$ is given by:

$$I_{DISCHR} = \frac{\frac{R_4}{R_3+R_4} \times V_{out}}{R_{int2}} \quad (13)$$

where $R_{int2}$ is an internal resistor for converting voltage $V_{CD}$ into current. From equations (12) and (13), the difference current $I_{CHR}-I_{DISCHR}$ is given by:

$$I_{CHR} - I_{DISCHR} = \frac{\frac{R_2}{R_1+R_2} \times \left(\frac{V_{in}}{n} + V_{out}\right)}{R_{int1}} - \frac{\frac{R_4}{R_3+R_4} \times V_{out}}{R_{int2}} \quad (14)$$

If $R_{int1} = R_{int2}$ and $$\frac{R_2}{R_1} = \frac{R_4}{R_3},$$

the difference current $I_{CHR}-D_{DISCHR}$ becomes:

$$I_{CHR} - I_{DISCHR} = \frac{\frac{R_5}{R_4+R_5} \times \left(\frac{V_{in}}{n}\right)}{R_{int1}} \quad (15)$$

From equation (15), the internal capacitor $C_T$ is charged up only by the reflected input voltage, not output voltage.

Comparator $A_4$ compares voltage $V_{PD}$ with reference voltage $V_{ref2}$. When voltage $V_{PD}$ is lower than reference $V_{ref2}$, one short pulse is generated by pulse generator $A_2$.

This short pulse sets SR (set-reset) flip-flop $A_5$, and turns on the secondary-side switch Q2 through buffer block $A_6$.

During the secondary-side winding demagnetization time, which should be the turn-on period for the secondary-side switch Q2, the secondary-side controller 104 uses current sink $A_8$ to discharge ($I_{DISCHR}+I_{error}$) internal capacitor $C_T$, where $I_{error}$ is a programmable current that can be positive or negative. When the capacitor $C_T$ voltage discharges to $V_{ref3}$ level, the secondary-side switch Q2 is turned off through comparator $A_7$, SR flip-flop $A_5$ and buffer $A_6$. SR flip-flop $A_5$ is reset via logic block $A_{12}$ when both $T_{SRmax}$ and the output of comparator $A_7$ is positive. When the capacitor $C_T$ voltage discharges to $V_{ref1}$ level as indicated by comparator $A_9$, after some delay time $T_{dead}$ provided by logic block $A_{13}$ and delay block $A_{10}$ to get $t_{cal}$, time $t_{cal}$ is compared with the falling edge $t_{max}$ of $T_{SRmax}$ and the secondary-side controller 104 performs some judgement and adjustment through logic block $A_{11}$.

For high system frequencies or high line (AC input) conditions, the turn-on period $T_{ONprimary}$ of the primary-side switch Q1 is reduced, and the reflected input voltage $V_{PD}$ measured by the secondary-side controller 104 is not accurate. Under these conditions, voltage $V_{PD}$ settles. During the settling time, V-I converter $A_1$ is operating but not at the right level. As a result, V-I converter $A_1$ charges capacitor $C_T$ to an improper level (the voltage information is not correct during the settling time). When this voltage is converted to current for charging capacitor $C_T$, some error exists in $I_{CHR}$. Ideally, voltage $V_{PD}$ has no settling time and capacitor $C_T$ is charged at the input voltage level Vin for the full on-time period (rectangular voltage signal) of the secondary-side switch Q2. However, capacitor $C_T$ may be charged lower than what it should ideally be charged to. This means that the on-time period and thus the off time for the secondary-side switch Q2 may be set shorter than what it ideally should be, lowering system efficiency. From equation (6), the calculated turn-on period and off time for the secondary-side switch Q2 may be adversely affected.

The secondary-side controller 104 corrects this error by compensating for the shape of voltage $V_{PD}$, to account for the settling time so that $V_{PD}$ has a rectangular or quasi-rectangular shape. The circuit shown in FIG. 3 charges capacitor $C_T$ and makes the voltage look like a rectangular or quasi-rectangular voltage signal, by compensating the $V_{PD}$ signal. Pulse generator $A_2$, SR flip-flop $A_5$ and buffer block $A_6$ sample and hold voltage $V_{PD}$ at the proper level and the secondary-side controller 104 uses this voltage to calculate the charge current $I_{CHR}$ for charging capacitor $C_T$ during the next switching cycle.

As shown in FIG. 2, the target turn-on period and thus turn off time for the secondary-side switch Q2 should be given by:

$$T_{SRon} = T_{SRmax} - T_{dead} \quad (11)$$

where $T_{SRmax}$ is the maximum allowed turn-on period for the secondary-side switch Q2, and can be measured by a comparator included in or associated with the secondary-side controller 104.

From equation (11), if $T_{SRon}$ is shorter than $T_{SRmax}-T_{dead}$, the secondary-side controller 104 prolongs the turn-on period and thus delays the turn off time of switch Q2 for the next switching cycle, and makes the next switching cycle turn-on period equal to $T_{SRmax}-T_{dead}$. If $T_{SRon}$ is longer than $T_{SRmax}-T_{dead}$, the secondary-side controller 104 shortens the calculated turn-on period and thus pulls in the turn off time of switch Q2 for the next switching cycle, and makes next switching cycle turn-on period equal to $T_{SRmax}-T_{dead}$.

If $T_{SRon}$ is equal to $T_{SRmax}-T_{dead}$, the secondary-side controller 104 keeps the calculated turn-on period and thus off time of switch Q2 time for the next switching cycle, and makes the next switching cycle turn-on period equal to $T_{SRmax}-T_{dead}$.

Figure 4:
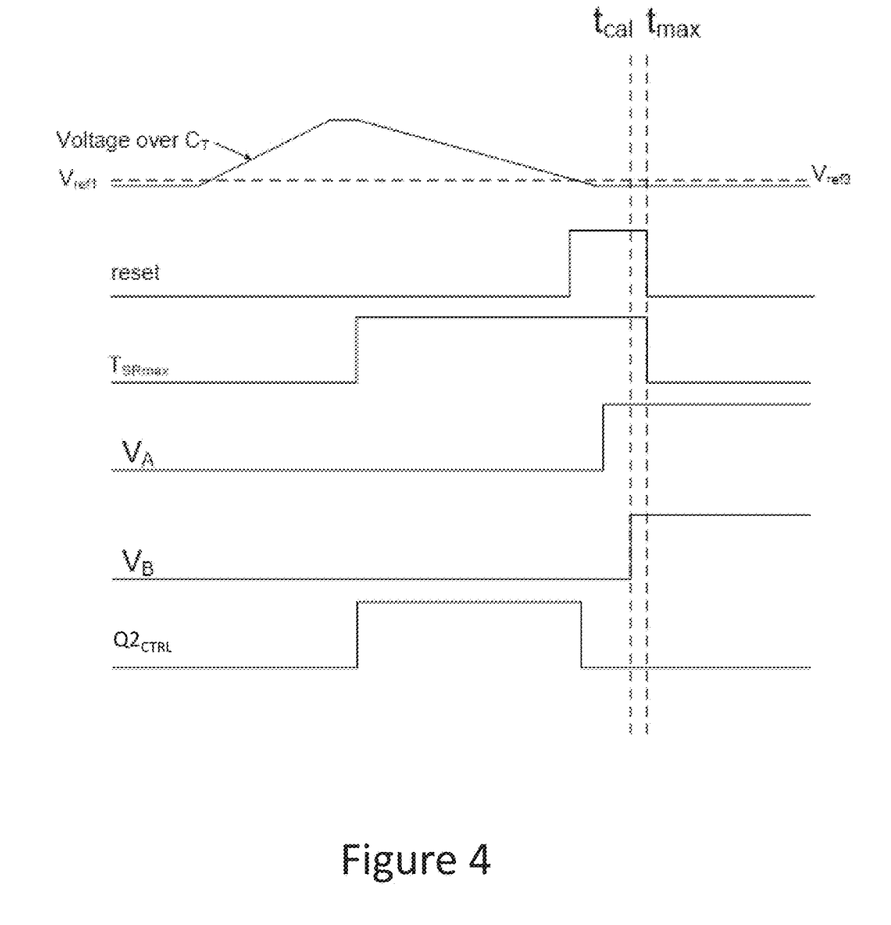
FIGS. 4 through 6 illustrate different scenarios handled by the compensated secondary-side SR switch control technique.
Figure 5:
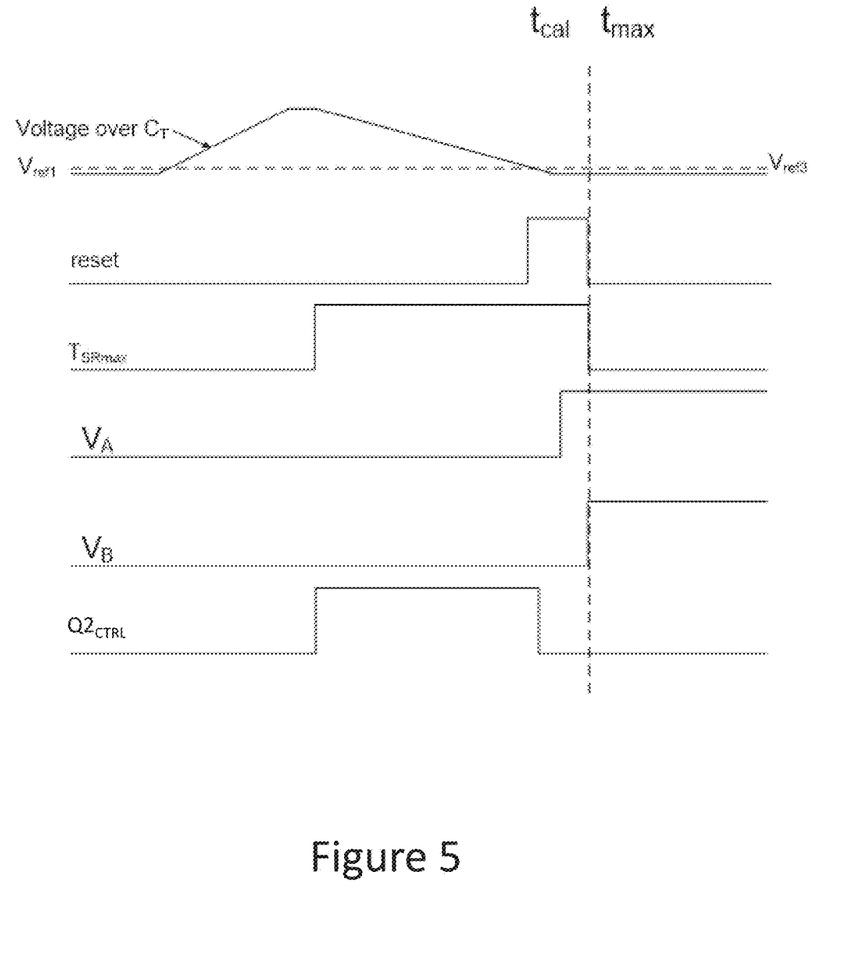
Figure 6:
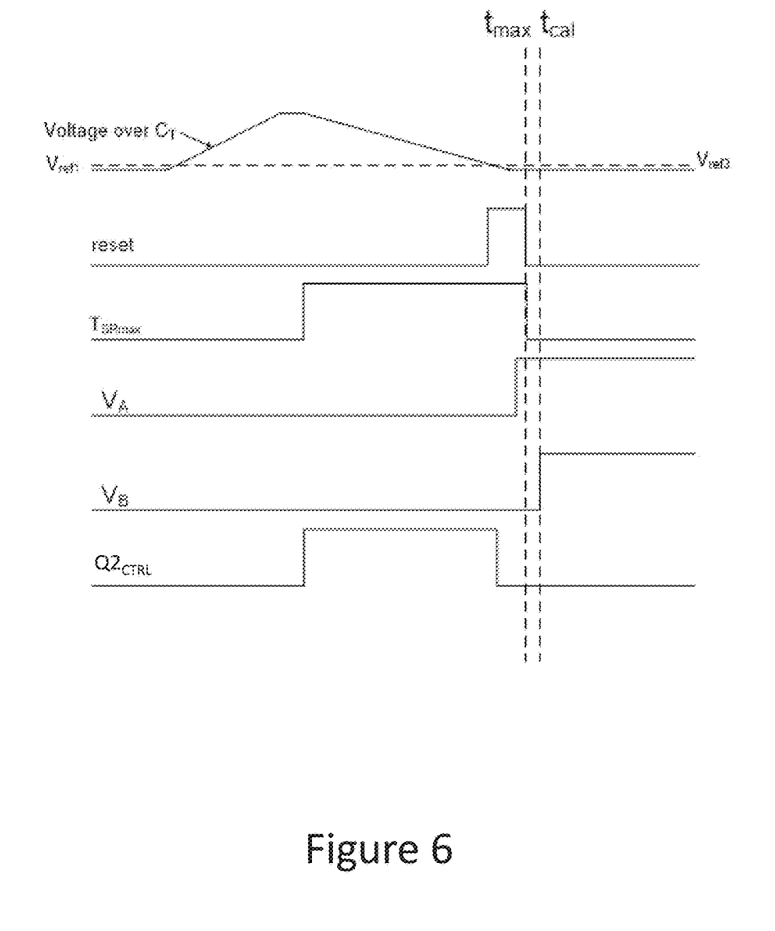

FIGS. 4 through 6 illustrate the scenarios described above and handled by the secondary-side controller 104. Ideally, time $t_{cal}$ should happen at the same time as $t_{max}$ for the present switching cycle. If time $t_{cal}$ happens before time $t_{max}$ as shown in FIG. 4, which means that the discharge time for capacitor $C_T$ is too short for the present switching cycle, the secondary-side controller 104 reduces discharge current $I_{error}$ by ΔI so that $t_{cal}$ approaches $t_{max}$ for the next switching cycle.

If time $t_{cal}$ happens at the same time as $t_{max}$ as shown in FIG. 5, the discharge time for capacitor $C_T$ is ideal for the present switching cycle. The secondary-side controller 104 maintains the discharge current $I_{DISCHR}+I_{error}$ at the present level, so that $t_{cal}$ will be at the same time as $t_{max}$ for the next switching cycle.

If time $t_{cal}$ happens after $t_{max}$ as shown in FIG. 6, $t_{cal}$ happens after $t_{max}$, which means that the discharge time for capacitor $C_T$ is too long for the present switching cycle. The secondary-side controller 104 increases the discharge current $I_{error}$ e.g. by 5×ΔI, 10×ΔI, or even higher so that $t_{cal}$ will be earlier than $t_{max}$ for the next switching cycle.

Figure 7:
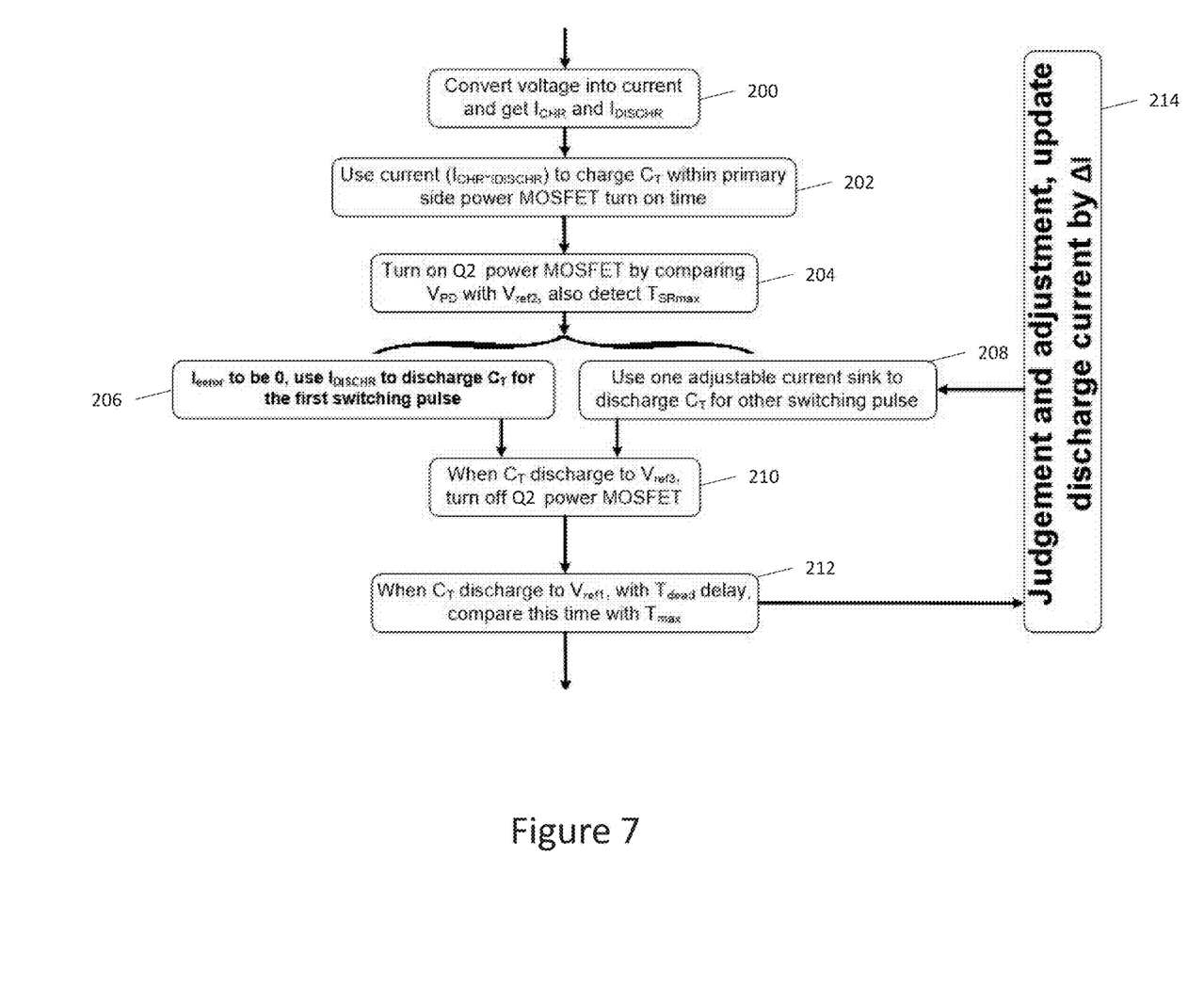
FIG. 7 illustrates a flow diagram of an embodiment of the compensated secondary-side SR switch control technique.

FIG. 7 illustrates an embodiment of the control technique implemented by the secondary-side controller 104. The control technique can be used for both DCM and CCM (continuous conduction mode) operation of the secondary-side switch Q2. The secondary-side controller 104 converts voltage $V_{PD}$ into current $I_{CHR}$ and voltage $V_{CD}$ into current $I_{DISCHR}$ (Block 200). During the turn-on period of the primary-side switch Q1, the secondary-side controller 104 uses difference current $I_{CHR}-I_{DISCHR}$ to charge internal capacitor $C_T$ (Block 202). After the primary-side switch Q1 is turned off, the secondary-side controller 104 turns on the secondary-side switch Q2 when $V_{PD}$ is lower than threshold voltage $V_{ref2}$ (Block 204). For the first switching pulse of the secondary-side switch Q2, the secondary-side controller 104 uses one current $I_{DISCHR}$ to discharge internal capacitor $C_T$ during the turn-off period of the secondary-side switch Q2 (Block 206). The secondary-side controller 104 uses one programmable current $I_{DISCHR}+I_{error}$ to discharge internal capacitor $C_T$ during the turn-on period of the secondary-side switch Q2 for the subsequent switching cycles (Block 208). When the voltage across internal capacitor $C_T$ is discharged to $V_{ref3}$, the secondary-side controller 104 turns off the secondary-side switch Q2 (Block 210). Further, when the voltage across internal capacitor $C_T$ discharges to $V_{ref1}$, with one fixed delay time $T_{dead}$ to get time $t_{cal}$, which is compared with the maximum allowed $T_{SRmax}$ falling edge $t_{max}$ (Block 212), the secondary-side controller 104 performs the following evaluations and adjustments (Block 214):

$t_{cal}$ happens before $t_{max}$, which means that discharge time for capacitor $C_T$ is too short for the present switching cycle. For the optimal result, $t_{cal}$ should happen the same time as $t_{max}$. For the next switching cycle, the secondary-side controller 104 reduces discharge current $I_{error}$ by ΔI, and $t_{cal}$ will be approach to $t_{max}$ for the next switching cycle;

$t_{cal}$ happens the same time as $t_{max}$, which means that discharge time for capacitor $C_T$ is already optimal for the present switching cycle. The secondary-side controller 104 maintains the discharge current $I_{error}$, and $t_{cal}$ will be the same as $t_{max}$ for the next switching cycle;

$t_{cal}$ happens after $t_{max}$, which means that discharge time for capacitor $C_T$ is too long for the present switching cycle. For the optimal result, $t_{cal}$ should happen the same time as $t_{max}$. For the next switching cycle, the secondary-side controller 104 increases the discharge current $I_{error}$ (for example, by 5×ΔI, 10×ΔI, or even higher), and $t_{cal}$ will be earlier than $t_{max}$ for the next switching cycle.

With the control technique described above, the turn-on period $T_{DET}$ and thus turn off time of the secondary-side switch Q2 can be calculated based on the previous switching cycle and the present product of charge-voltage and charge-time, and the errors induced by the measurement of the reflected input voltage and parasitic parameters are cancelled. Also, the discharge current depends on output voltage and therefore is adapted for a jump (sudden increase) in the output voltage. Furthermore, there is no need for high voltage chip technology with very low threshold detection and the control technique can be used for both DCM and CCM operation.

By using the volt-second balance equation, also based on the previous switching cycle demagnetization time and present product of input voltage over turn-on time, the secondary-side controller 104 can correct the volt-second equation and provide accurate transistor turn-on period and thus off time for the next switching cycle. The turn-on period and off time can be tuned based on the difference between calculated turn-on time and measured turn-on time, to yield an optimum result. Errors introduced by the reflected input voltage measurement and parasitic parameters are also cancelled by the control technique described herein.

Figure 8:
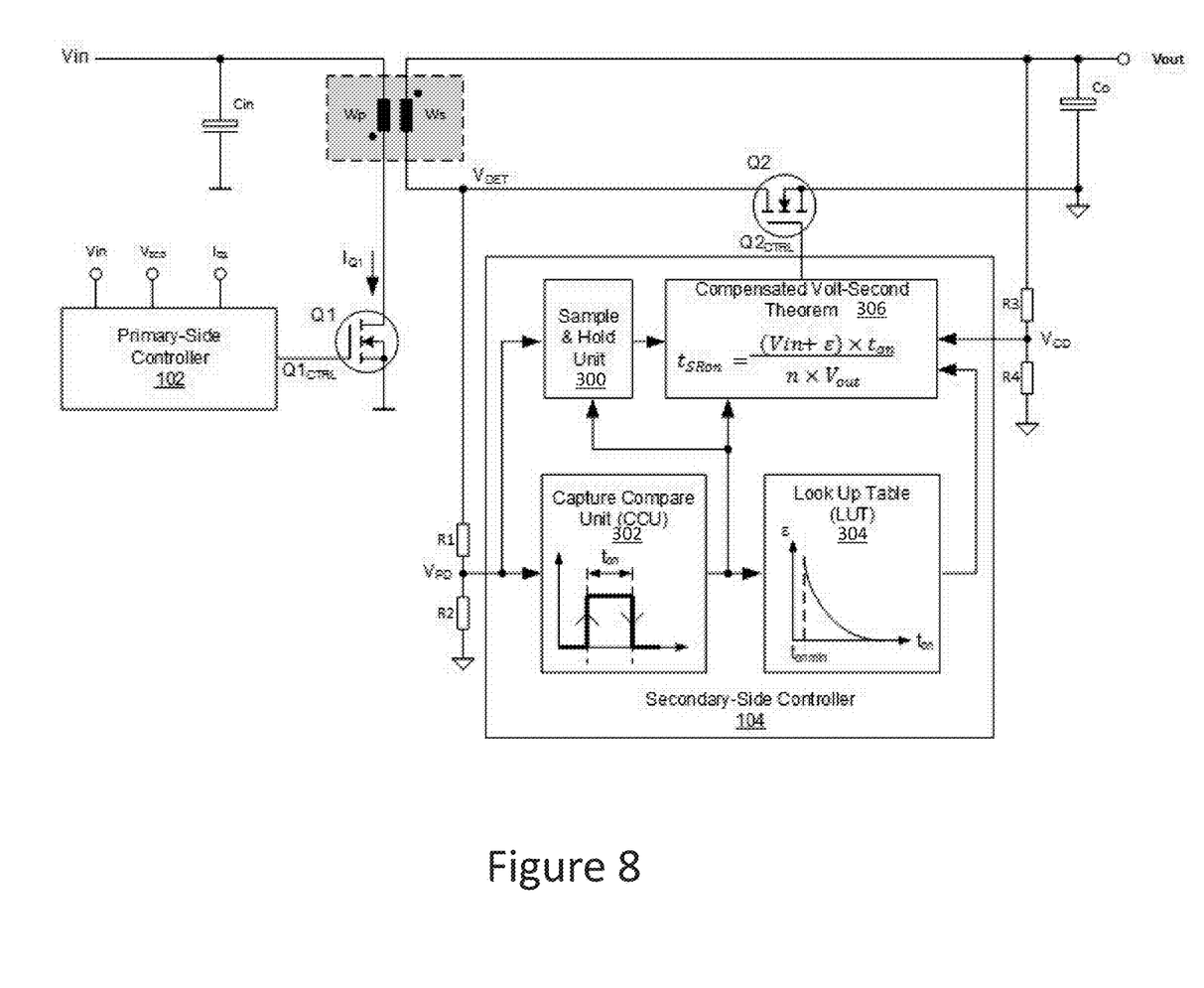
FIG. 8 illustrate a circuit diagram of a digital-based embodiment of the compensated secondary-side SR switch control technique.

FIG. 8 illustrates a block diagram of a digital-based implementation of the SR control technique implemented by the secondary-side controller 104. According to this embodiment, capacitor $C_T$ is not used and the secondary-side controller 104 does not necessarily need the previous cycle information. At the end of the present on-time period for the primary-side switch Q1, the secondary-side controller 104 needs to sample the reflected input voltage measured at the secondary-side winding Ws. However, the secondary-side controller 104 does not know the end of the primary-side switch Q1 on-time period once the primary-side switch Q1 is turned on. In one embodiment, the secondary-side controller 104 includes a sample-and-hold unit 300 which samples the stepped down version $V_{PD}$ of the reflected input voltage $V_{DET}$ measured at the secondary-side winding Ws over an open window that always samples, and captures the value when the primary-side switch Q1 turns off. The falling edge of the turn-off event of primary-side switch Q1 is detected by an integrated capture compare unit (CCU) 302, which triggers the sample and hold unit 300 for the capturing event of the input voltage. Furthermore, the CCU 302 estimates the on-time period of the primary-side switch Q1 based on the captured edges of the sampling window. The captured on-time is fed to a lookup table (LUT) 304 which contains the associated error figures for very small on-time values when the reflected voltage is not yet settled during primary-side switch Q1 turn-on phase (see FIG. 2). The corresponding error figure is fed to a calculation unit 306 for determining the on-time of the secondary-side switch Q2, which is based on the volt-second theorem equation previously described herein. By considering the error figure from the LUT 304 within the calculation for the on-time of the secondary-side switch Q2, the sampled deviated input voltage is compensated for very small on-time periods of the primary-side switch Q1. The secondary-side switch Q2 turns on immediately when the primary-side switch Q1 turns off.

The secondary-side controller 104 provides a minimum on-time period for the secondary-side switch Q2, and calculates the off-time during this period.

Terms such as "first", "second", and the like, are used to describe various elements, regions, sections, etc, and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of operating a flyback converter having a primary-side switch connected to a primary-side winding of a transformer and a secondary-side switch connected to a secondary-side winding of the transformer, the method comprising:

controlling the primary-side switch to store energy in the transformer during ON periods of the primary-side switch;

switching on the secondary-side switch synchronously with switching off the primary-side switch to transfer energy from the transformer to the secondary side;

determining an off time of the secondary-side switch based on a reflected input voltage measured at the secondary-side winding when the primary-side switch is on;

accounting for a settling time of the reflected input voltage when determining the off time of the secondary-side switch, so that the settling time has little or no effect on the off time; and switching off the secondary-side switch based on the off time, wherein the flyback converter comprises a current source configured to provide a charge current for charging a capacitor on the secondary side when the primary-side switch is on and a current sink configured to sink a discharge current for discharging the capacitor when the secondary-side switch is on, and wherein accounting for the settling time of the reflected input voltage when determining the off time of the secondary-side switch comprises:

adjusting the discharge current for a present switching cycle of the secondary-side switch by an error current which is based on a comparison of the off time determined for a previous switching cycle of the secondary-side switch to a maximum off time calculated for the secondary-side switch.

2. The method of claim 1, wherein switching off the secondary-side switch based on the off time comprises:

switching off the secondary-side switch when the voltage across the capacitor decreases to a first reference value.

3. The method of claim 1, wherein adjusting the discharge current for the present switching cycle of the secondary-side switch based on the reflected input voltage as measured at steady-state after the settling time lapses during the previous switching cycle comprises:
   comparing the off time determined for the previous switching cycle of the secondary-side switch to a maximum off time calculated for the secondary-side switch; and
   decreasing the error current for the present switching cycle of the secondary-side switch if the off time determined for the previous switching cycle is less than the maximum off time.

4. The method of claim 1, wherein adjusting the discharge current for the present switching cycle of the secondary-side switch based on the reflected input voltage as measured at steady-state after the settling time lapses during the previous switching cycle comprises:
   comparing the off time determined for the previous switching cycle of the secondary-side switch to a maximum off time calculated for the secondary-side switch; and
   increasing the error current for the present switching cycle of the secondary-side switch if the off time determined for the previous switching cycle is greater than the maximum off time.

5. The method of claim 1, wherein adjusting the discharge current for the present switching cycle of the secondary-side switch based on the reflected input voltage as measured at steady-state after the settling time lapses during the previous switching cycle comprises:
   comparing the off time determined for the previous switching cycle of the secondary-side switch to a maximum off time calculated for the secondary-side switch; and
   maintaining the same error current for the present switching cycle of the secondary-side switch as the previous switching cycle if the off time determined for the previous switching cycle is the same as the maximum off time.

6. The method of claim 1, wherein adjusting the discharge current for the present switching cycle of the secondary-side switch based on the reflected input voltage as measured at steady-state after the settling time lapses during the previous switching cycle comprises:
   sampling values of the reflected input voltage during the previous switching cycle of the secondary-side switch and holding one of the values sampled at steady-state; and
   using the value of the reflected input voltage sampled at steady-state during the previous switching cycle of the secondary-side switch in determining the off time of the secondary-side switch for the present switching cycle of the secondary-side switch.

7. A flyback converter, comprising:
   a primary-side switch connected to a primary-side winding of a transformer;
   a secondary-side switch connected to a secondary-side winding of the transformer;
   a primary-side controller operable to control the primary-side switch to store energy in the transformer during ON periods of the primary-side switch;
   a secondary-side controller operable to:
      switch on the secondary-side switch synchronously with switching off the primary-side switch to transfer energy from the transformer to the secondary side;
      determine an off time of the secondary-side switch based on a reflected input voltage measured at the secondary-side winding when the primary-side switch is on;
      account for a settling time of the reflected input voltage when determining the off time of the secondary-side switch, so that the settling time has little or no effect on the off time; and
      switch off the secondary-side switch based on the off time;
   a current source configured to provide a charge current for charging a capacitor on the secondary side when the primary-side switch is on; and
   a current sink configured to sink a discharge current for discharging the capacitor when the secondary-side switch is on,
   wherein the secondary-side controller is operable to adjust the discharge current for a present switching cycle of the secondary-side switch by an error current which is based on a comparison of the off time determined for a previous switching cycle of the secondary-side switch to a maximum off time calculated for the secondary-side switch.

8. The flyback converter of claim 7, wherein the secondary-side controller is operable to switch off the secondary-side switch when the voltage across the capacitor decreases to a first reference value.

9. The flyback converter of claim 7, wherein the secondary-side controller is operable to:
   compare the off time determined for the previous switching cycle of the secondary-side switch to a maximum off time calculated for the secondary-side switch; and
   decrease the error current for the present switching cycle of the secondary-side switch if the off time determined for the previous switching cycle is less than the maximum off time.

10. The flyback converter of claim 7, wherein the secondary-side controller is operable to:
   compare the off time determined for the previous switching cycle of the secondary-side switch to a maximum off time calculated for the secondary-side switch; and
   increase the error current for the present switching cycle of the secondary-side switch if the off time determined for the previous switching cycle is greater than the maximum off time.

11. The flyback converter of claim 7, wherein the secondary-side controller is operable to:
   compare the off time determined for the previous switching cycle of the secondary-side switch to a maximum off time calculated for the secondary-side switch; and
   maintain the same error current for the present switching cycle of the secondary-side switch as the previous switching cycle if the off time determined for the previous switching cycle is the same as the maximum off time.

12. The flyback converter of claim 7, wherein the secondary-side controller is operable to:
   sample values of the reflected input voltage during the previous switching cycle of the secondary-side switch and hold one of the values sampled at steady-state; and
   use the value of the reflected input voltage sampled at steady-state during the previous switching cycle of the secondary-side switch in determining the off time of the secondary-side switch for the present switching cycle of the secondary-side switch.

* * * * *